US011082265B2

(12) United States Patent
Chopra et al.

(10) Patent No.: US 11,082,265 B2
(45) Date of Patent: Aug. 3, 2021

(54) TIME SYNCHRONIZATION OF MOBILE CHANNEL SOUNDING SYSTEM

(71) Applicant: AT&T Intellectual Property I, L.P., Atlanta, GA (US)

(72) Inventors: Aditya Chopra, Austin, TX (US); Saeed Ghassemzadeh, Austin, TX (US); Arunabha Ghosh, Austin, TX (US); Andrew Thornburg, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 43 days.

(21) Appl. No.: 16/527,180

(22) Filed: Jul. 31, 2019

(65) Prior Publication Data
US 2021/0036894 A1    Feb. 4, 2021

(51) Int. Cl.
*H04L 25/02* (2006.01)
*H04W 72/04* (2009.01)
(Continued)

(52) U.S. Cl.
CPC ..... *H04L 25/0224* (2013.01); *H04W 56/0005* (2013.01); *H04W 72/04* (2013.01); *H04W 84/12* (2013.01)

(58) Field of Classification Search
CPC .............. H04L 25/0224; H04W 72/04; H04W 56/0005; H04W 84/12
See application file for complete search history.

(56) References Cited

U.S. PATENT DOCUMENTS 6,256,303 B1 *  7/2001  Drakoulis ................ H04B 1/16
                                                            342/125
6,269,092 B1    7/2001  Schilling
(Continued)

FOREIGN PATENT DOCUMENTS

CN    104507108 A1    4/2015
EP      2819454 A1   12/2014
(Continued)

OTHER PUBLICATIONS

Z. Yu, R. Baxley, Brett T. Walkenhorst, G. Zhou, Channel Sounding Waveforms Design for Asynchronous Multiuser MIMO Systems, Feb. 19, 2013, arXiv:1302.4717v1.*

(Continued)

*Primary Examiner* — Ajit Patel
*Assistant Examiner* — Wilfred Thomas

(57) ABSTRACT

In one example, a processing system of a mobile channel sounding transmitter including at least one processor may establish a wireless side link between the mobile channel sounding transmitter and a channel sounding receiver, transmit, to the channel sounding receiver, a wireless synchronization signal via the wireless side link, and transmit at least one channel sounding waveform in accordance with the wireless synchronization signal. In another example, a processing system of a channel sounding receiver including at least one processor may establish a wireless side link between a mobile channel sounding transmitter and the channel sounding receiver, obtain, from the mobile channel sounding transmitter, a wireless synchronization signal via the wireless side link, and obtain, from the mobile channel sounding transmitter, at least one channel sounding waveform in accordance with the wireless synchronization signal.

20 Claims, 5 Drawing Sheets

(51) Int. Cl.
*H04W 56/00* (2009.01)
*H04W 84/12* (2009.01)
*H04B 7/0413* (2017.01)

(56) References Cited

U.S. PATENT DOCUMENTS

| | | | |
|---|---|---|---|
| 6,711,204 B2 | 3/2004 | Schilling | |
| 8,179,824 B2 | 5/2012 | Seong et al. | |
| 8,289,863 B2 | 10/2012 | Vook et al. | |
| 8,351,411 B2 | 1/2013 | Kim et al. | |
| 8,463,298 B2 | 6/2013 | Kim et al. | |
| 8,531,937 B2 | 9/2013 | Levy | |
| 8,565,673 B2 | 10/2013 | Hu | |
| 8,599,945 B2 | 12/2013 | Sampath | |
| 8,655,348 B2 | 2/2014 | Zha et al. | |
| 8,660,015 B2 | 2/2014 | Issakov et al. | |
| 8,675,575 B2 | 3/2014 | Gong et al. | |
| 8,681,727 B2 | 3/2014 | Kinnunen et al. | |
| 8,831,125 B2 | 9/2014 | Wenersson et al. | |
| 8,873,408 B2 | 10/2014 | Siomina et al. | |
| 8,971,294 B2 | 3/2015 | Yan et al. | |
| 8,995,563 B2 | 3/2015 | Cho et al. | |
| 9,124,395 B2 | 9/2015 | Lin et al. | |
| 9,258,040 B2 | 2/2016 | Levy | |
| 9,264,928 B2 | 2/2016 | Liu et al. | |
| 9,270,438 B2 | 2/2016 | Lee et al. | |
| 9,295,044 B2 | 3/2016 | Novak et al. | |
| 9,300,495 B2 | 3/2016 | Dahlman et al. | |
| 9,307,544 B2 | 4/2016 | Gore et al. | |
| 9,326,916 B2 | 5/2016 | Tollman | |
| 9,331,386 B2 | 5/2016 | Wenersson et al. | |
| 9,332,443 B2 | 5/2016 | Xiao et al. | |
| 9,351,288 B2 | 5/2016 | Pi | |
| 9,351,315 B2 | 5/2016 | Bao et al. | |
| 9,414,371 B2 | 8/2016 | Pi et al. | |
| 9,420,584 B2 | 8/2016 | Blankenship et al. | |
| 9,439,086 B2 | 9/2016 | Emmanuel et al. | |
| 9,444,531 B2 | 9/2016 | Levy | |
| 9,444,596 B2 | 9/2016 | Chung et al. | |
| 9,455,772 B2 | 9/2016 | Zhang et al. | |
| 9,473,226 B2 | 10/2016 | Shattil | |
| 9,473,967 B2 | 10/2016 | Zhang et al. | |
| 9,496,609 B2 | 11/2016 | Marshall et al. | |
| 9,497,047 B2 | 11/2016 | Josiam et al. | |
| 9,510,314 B2 | 11/2016 | Schmidt et al. | |
| 9,537,623 B2 | 1/2017 | Zhang | |
| 9,629,122 B2 | 4/2017 | Yoon et al. | |
| 9,629,171 B2 | 4/2017 | Roy et al. | |
| 9,635,579 B2 | 4/2017 | Wang et al. | |
| 9,654,236 B2 | 5/2017 | Jeong et al. | |
| 9,730,151 B2 | 8/2017 | Jia et al. | |
| 9,763,180 B1* | 9/2017 | Lee | H04W 48/18 |
| 9,949,298 B1 | 4/2018 | Akoum et al. | |
| 2002/0018462 A1* | 2/2002 | Thompson | H04W 72/04 |
| | | | 370/352 |
| 2002/0122413 A1* | 9/2002 | Shoemake | H04L 29/06 |
| | | | 370/349 |
| 2003/0058816 A1* | 3/2003 | Shearer | H04W 72/04 |
| | | | 370/329 |
| 2007/0076649 A1* | 4/2007 | Lin | H04W 76/15 |
| | | | 370/328 |
| 2008/0002658 A1* | 1/2008 | Soliman | H04W 76/14 |
| | | | 370/343 |
| 2008/0037469 A1* | 2/2008 | Hamilton | H04W 36/08 |
| | | | 370/331 |
| 2009/0274226 A1 | 11/2009 | Mondal et al. | |
| 2011/0228749 A1* | 9/2011 | Taghavi Nasrabadi | |
| | | | H04W 76/20 |
| | | | 370/338 |
| 2013/0028200 A1* | 1/2013 | Nory | H04W 72/02 |
| | | | 370/329 |
| 2013/0290525 A1 | 10/2013 | Fedor et al. | |
| 2014/0146716 A1* | 5/2014 | Chen | H04L 5/16 |
| | | | 370/277 |
| 2014/0146732 A1 | 5/2014 | Olufunmilola et al. | |
| 2014/0321314 A1 | 10/2014 | Fodor et al. | |
| 2015/0052255 A1* | 2/2015 | Sun | H04W 76/18 |
| | | | 709/227 |
| 2015/0134419 A1 | 5/2015 | Kandasamy et al. | |
| 2015/0163271 A1 | 6/2015 | Handuruksande et al. | |
| 2015/0257121 A1 | 9/2015 | Siomina et al. | |
| 2015/0373637 A1 | 12/2015 | Wang et al. | |
| 2016/0119902 A1 | 4/2016 | Cheong et al. | |
| 2016/0127006 A1 | 5/2016 | Majjigi et al. | |
| 2016/0173259 A1 | 6/2016 | Lee et al. | |
| 2016/0204910 A1 | 7/2016 | Kim et al. | |
| 2016/0269157 A1 | 9/2016 | Soriaga et al. | |
| 2016/0269158 A1 | 9/2016 | Soriaga et al. | |
| 2016/0270087 A1 | 9/2016 | Soriaga et al. | |
| 2016/0337872 A1 | 11/2016 | Alrabadi et al. | |
| 2016/0380732 A1 | 12/2016 | Chung et al. | |
| 2017/0026156 A1 | 1/2017 | Thomas et al. | |
| 2017/0064518 A1 | 3/2017 | Kim et al. | |
| 2017/0094676 A1 | 3/2017 | Kim et al. | |
| 2017/0099127 A1 | 4/2017 | Byun et al. | |
| 2017/0141823 A1 | 5/2017 | Fodor et al. | |
| 2017/0207843 A1 | 7/2017 | Jung et al. | |
| 2017/0223655 A1 | 8/2017 | Huang et al. | |
| 2017/0223690 A1 | 8/2017 | Zeng et al. | |
| 2017/0238268 A1 | 8/2017 | Yang et al. | |
| 2017/0346539 A1 | 11/2017 | Islam et al. | |
| 2017/0346544 A1 | 11/2017 | Islam et al. | |
| 2017/0346545 A1 | 11/2017 | Islam et al. | |
| 2018/0020383 A1 | 1/2018 | Sirotkin et al. | |
| 2018/0069606 A1 | 3/2018 | Jung et al. | |
| 2018/0123654 A1 | 5/2018 | Park et al. | |
| 2018/0131434 A1 | 5/2018 | Islam et al. | |
| 2019/0058533 A1 | 2/2019 | Ghosh et al. | |
| 2019/0150214 A1* | 5/2019 | Zhou | H04L 1/1621 |
| | | | 370/329 |
| 2019/0190635 A1* | 6/2019 | Goel | H04W 56/001 |
| 2019/0223066 A1* | 7/2019 | Xu | H04W 36/0058 |
| 2019/0223241 A1* | 7/2019 | Manolakis | H04W 76/14 |
| 2019/0387459 A1* | 12/2019 | McCann | H04W 8/26 |
| 2020/0045660 A1* | 2/2020 | Lee | H04W 72/0406 |
| 2020/0196243 A1* | 6/2020 | Kim | H04W 56/00 |
| 2020/0343951 A1* | 10/2020 | Hou | H04B 1/44 |

FOREIGN PATENT DOCUMENTS

| | | |
|---|---|---|
| EP | 3120601 A1 | 1/2017 |
| KR | 20170057853 A1 | 5/2017 |
| WO | 2010145427 A1 | 12/2010 |
| WO | 2015010339 A1 | 1/2015 |
| WO | 2016130403 A1 | 8/2016 |
| WO | 2017086922 A1 | 5/2017 |

OTHER PUBLICATIONS

"Making 5G NR a Reality", Qualcomm®, qualcomm.com, accessed Aug. 2017. 30 Pages.

Jinxing Li et al., "System Design and Calibration for Wideband Channel Sounding With Multiple Frequency Bands", IEEE Access 5 (2017). pp. 781-793.

"High Frequency and High Speed Design Engineers Unite in Boston", Microwave Journal, microwavejournal.com, Oct. 1, 2016. 15 Pages.

Koen Langendoen, "Medium access control in wireless sensor networks." Medium access control in wireless networks vol. 2 (2008). 22 Pages.

Ayman Elnashar et al., "Looking at LTE in practice: A performance analysis of the LTE system based on field test results", IEEE Vehicular Technology Magazine vol. 8, Issue 3 (2013). pp. 81-92. https://www.researchgate.net/profile/Ayman_Elnashar/publication/260654677_Looking_at_LTE_in_Practice_A_Performance_Analysis_of_the_LTE_System_Based_on_Field_Test_Results/links/56b0ad0008ae9ea7c3b1e552.pdf.

J. J. Kayra, "A Survey on the Effect of LTE Advanced on Drive Test Tool Requirements", signal 10.11: 12. 4 Pages. http://www.oamk.fi/~karil/mit_studies/wireless_future_seminar/papers2013/final_paper_kayra_janne.pdf.

(56) References Cited

OTHER PUBLICATIONS

Ionel Petrut et al., "User Experience Analysis on Real 3G/4G Wireless Networks", ACTA Electrotehnica vol. 56, No. 1-2, Mediamira Science Publisher (2015). pp. 131-134. http://ie.utcluj.ro/files/acta/2015/Number1-2/paper23_Petrut.pdf.

Nicholas Gresset et al., "Interference-avoidance techniques: Improving ubiquitous user experience", IEEE Vehicular Technology Magazine vol. 7, Issue 4 (2012). pp. 37-45. http://www.fr.mitsubishielectric-rce.eu/images/fck_upload/Gresset_VT12.pdf.

Duk-Sun Shim et al., "Application of Motion Sensors for Beam-Tracking of Mobile Stations in mmWave Communication Systems", Sensors vol. 14, No. 10 (2014). pp. 19622-19638. http://www.mdpi.com/1424-8220/14/10/19622/.

R. Mondal et al., "Performance evaluation of MDT assisted LTE RF fingerprint framework", 2014 Seventh International Conference on Mobile Computing and Ubiquitous Networking (ICMU) (2014). pp. 33-37. 10.1109/ICMU.2014.6799054. https://www.researchgate.net/publication/271462429_Performance_evaluation_of_MDT_assisted_LTE_RF_fingerprint_framework.

"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", 3GPP TS 37.320 version 12.2.0 Release 12, ETSI TS 137 V12.2.0 (2014). 27 Pages. http://www.etsi.org/deliver/etsi_ts/137300_137399/137320/12.02.00_60/ts_137320v120200p.

Azad Ravanshid et al., "Multi-connectivity functional architectures in 5G". 2016 IEEE International Conference on Communications Workshops (ICC) (2016). 6 Pages. https://5gnorma.5g-ppp.eu/dissemination/conference-papers/.

Paul Harris et al., "An overview of massive MIMO research at the University of Bristol", presented at the IET Radio Propagation and Technologies for 5G Conference (2016). 5 Pages. https://arxiv.org/abs/1705.07540.

C. U. Bas, et al. "A Real-Time Millimeter-Wave Phased Array MIMO Channel Sounder," CoRR, abs/1703.05271, 2017, http://arxiv.org/abs/1703.05271.

C. Umit Bas, et al. "Real-Time Millimeter-Wave MIMO Channel Sounder for Dynamic Directional Measurements," 2018, 1807.11921,arXiv, eess.SP.

\* cited by examiner

TIME SYNCHRONIZATION OF MOBILE CHANNEL SOUNDING SYSTEM

The present disclosure relates generally to wireless communication networks, and more particularly to methods, non-transitory computer readable media, and apparatuses for synchronizing a mobile channel sounding transmitter and a channel sounding receiver via a wireless side link.

BACKGROUND

A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), and the like, as experienced by a user equipment or base station. In one implementation, a wireless channel sounder may utilize a directional antenna. For instance, to measure AoA using a directional antenna, the antenna may be turned in incremental steps to measure the RSS. The AoA is recorded where the RSS is at a maximum. While this solution is inexpensive, it is a relatively slow measurement technique.

SUMMARY

In one example, the present disclosure discloses a method, computer-readable medium, and mobile channel sounding transmitter for synchronizing a mobile channel sounding transmitter and a channel sounding receiver via a wireless side link. For example, a processing system of a mobile channel sounding transmitter including at least one processor may establish a wireless side link between the mobile channel sounding transmitter and a channel sounding receiver, transmit, to the channel sounding receiver, a wireless synchronization signal via the wireless side link, and transmit at least one channel sounding waveform in accordance with the wireless synchronization signal.

In another example, the present disclosure discloses an additional method, computer-readable medium, and mobile channel sounding receiver for synchronizing a mobile channel sounding transmitter and a channel sounding receiver via a wireless side link. For instance, a processing system of a channel sounding receiver including at least one processor may establish a wireless side link between a mobile channel sounding transmitter and the channel sounding receiver, obtain, from the mobile channel sounding transmitter, a wireless synchronization signal via the wireless side link, and obtain, from the mobile channel sounding transmitter, at least one channel sounding waveform in accordance with the wireless synchronization signal.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
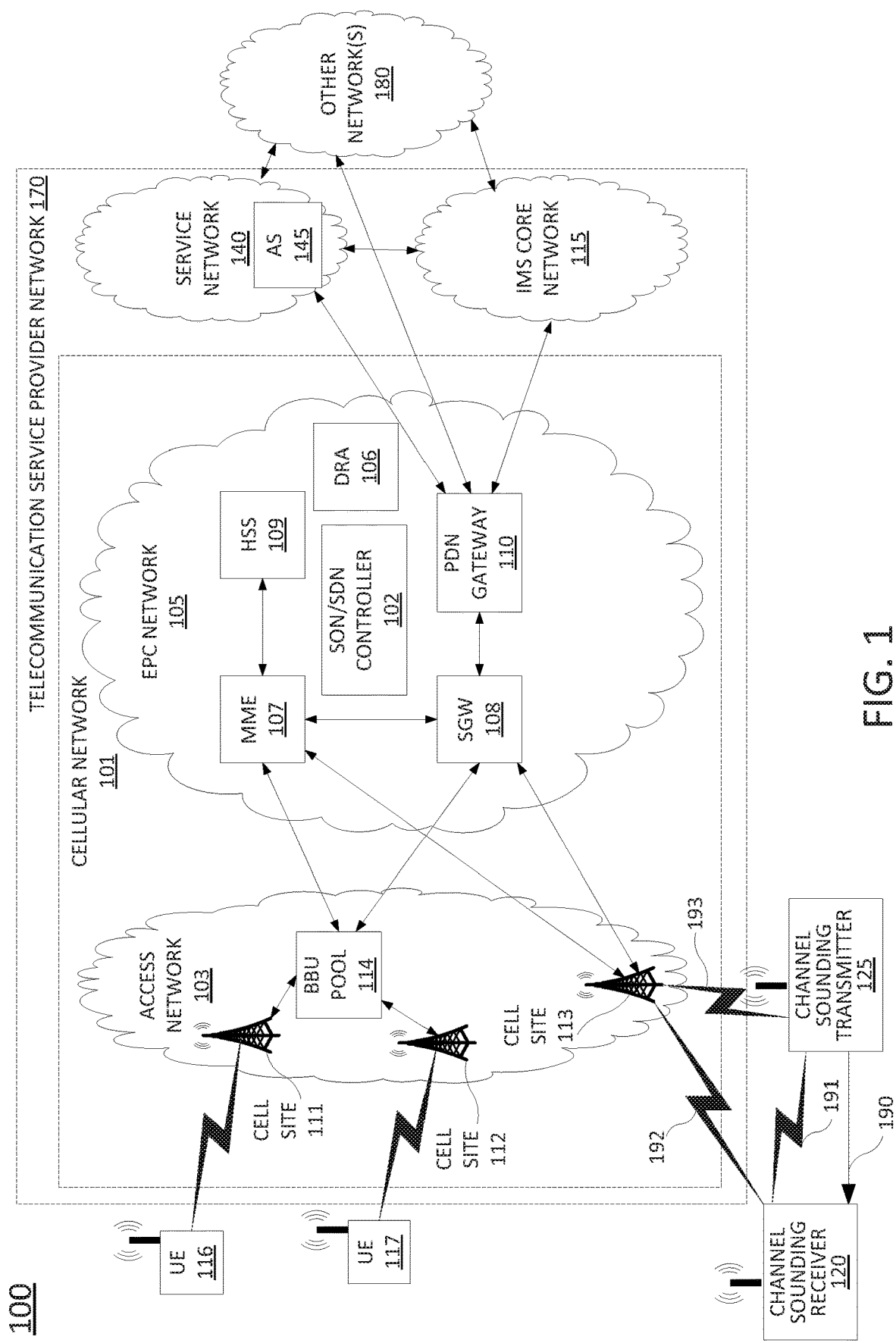
FIG. 1 illustrates an example system, in accordance with the present disclosure.

The present disclosure broadly discloses methods, computer-readable media, and devices for synchronizing a mobile channel sounding transmitter and a channel sounding receiver via a wireless side link. Developing 3GPP Fifth Generation (5G) standards include the use of millimeter wave frequencies (30 GHz to 300 GHz) as carrier frequencies. The propagation loss of air at such frequencies is relatively high. One technique to overcome this loss is the use of beamformed wireless communication. In beamformed communications, wireless signals are transmitted in a narrow beam. The concentration of energy in a narrow beam helps overcome the propagation loss of the wireless medium. Similarly, 5G receivers may also sense wireless signals in a narrow region of space, allowing the capture of a large amount of signal energy and correspondingly low amounts of noise and interference energy. This is relevant to channel sounding, as 5G channel models should provide metrics with respect to a spatial grid around the transmitter or the receiver.

For deployment and configuration of wireless network infrastructure, it is beneficial to obtain a wireless channel's propagation within the frequency bands of interest to the standard. The act of making such wireless channel propagation measurements is known as channel sounding. Channel sounding typically operates by transmitting a known wireless signal in the frequency band of interest by a channel sounding transmitter, and subsequently receiving this signal at a different location by a channel sounding receiver. Knowing both the transmitted and the received signal, the state of the channel at the time of transmission can be extracted, resulting in what may be referred to as a "channel snapshot." Multiple of such channel snapshots can be acquired by varying the hardware location, orientation, speed, time of transmission, and even the environment around the channel sounder transmitter and the channel sounding receiver. The resulting dataset of channel snapshots may be subsequently analyzed to extract channel models to be used for standards development, as well as network infrastructure deployment, configuration, and optimization.

Based on multiple antennas at both transmitters and receivers, a M×N (M transmit antennas and N receive antennas) multiple input multiple output (MIMO) channel sounding system is able to measure directional channel propagation at both ends of the wireless link (e.g., at the transmit and receive antennas) and improve resolution of the spatial multiple path parameters. In one example, a channel sounding system may transmit a known signal (broadly a "channel sounding signal" or "channel sounding waveform") via a first transmit beam direction of a channel sounding transmitter, and measure the channel parameters via all N receive antennas at the channel sounding receiver. The channel sounding transmitter may then switch to a second transmit beam direction and the process repeats until all M×N combinations have been performed.

To enable accurate channel sounding, the channel sounding transmitter and channel sounding receiver should be synchronized. In a current MIMO channel sounding system, a channel sounding receiver may require a pre-allocated measurement time before the channel sounding transmitter can switch from one beam direction to another and/or from one location to another. Thus, for a receiver to perform all measurements, data processing, and so on, the receiver may require information on which transmit beam is currently being used, as well as a means to inform the transmitter to switch to the next beam direction and/or position. In certain channel sounding systems, for fully clock synchronization/recovery the control link has been either over a fiber/cable link where the length of cable is known, or using a rubidium clock which may still drift after an hour or so. The former is challenging for outdoor measurements due to the impracticality of having a cable/fiber deployed over the measurement area and the latter may require resynchronization at least every hour.

Examples of the present disclosure describe methods, computer-readable media, and devices for synchronizing a mobile channel sounding transmitter and a channel sounding receiver via a wireless side link. In particular, the wireless side link may be a wireless connection that utilizes different resources from the channel sounding. For instance, the wireless side link may comprise an out-of-band wireless link, such as a cellular or non-cellular wireless communication session (e.g., an LTE-based or IEEE 802.11/Wi-Fi-based communication session), where the channel sounding takes place on a different set of time and frequency resources than used by the wireless communication session. In one example, the out-of-band wireless link may comprise a communication session between the mobile channel sounding transmitter and the channel sounding receiver in accordance with a set of non-restricted frequency resources (e.g., in one or more Industrial, Scientific, and Medical (ISM) radio band(s), such as 915 MHz, 2.4 GHz, or 5 GHz). Similar to the previous examples, the channel sounding takes place on a different set of time and frequency resources than used by the wireless communication session. In addition, the transmitter and receiver may establish the communication session over the non-restricted frequency resources over a proprietary non-standardized PHY and/or via a software defined radio (SDR).

In another example, the out-of-band wireless link may comprise a communication session between the mobile channel sounding transmitter and the channel sounding receiver using frequency resources that are within an operational bandwidth of the transceivers at the transmitter and the receiver that are used for channel sounding, but outside of the frequencies within the operational bandwidth that are used for the channel sounding signals, or waveforms. In still another example, the wireless side link may comprise an in-band wireless link which uses the same frequency resources as are used for the channel sounding waveform(s), but which utilizes different, non-overlapping time slots from the channel sounding waveforms. Although examples of the present disclosure are applicable to a wide range of frequency bands, in one example, the present disclosure may relate to channel sounding in centimeter and millimeter wave ranges. For instance, for all of the examples herein, the considered wireless cellular communications standard may be the Third Generation Project (3GPP) New Radio (NR) and/or 5G radio access technology.

The wireless side link may be used to transmit a synchronization signal conveying clock timing information of the mobile channel sounding transmitter to the channel sounding receiver. In one example, the synchronization signal may further convey information regarding one or more channel sounding waveforms to be transmitted from the mobile channel sounding transmitter. For instance, the information regarding the at least one channel sounding waveform may include a transmit beam identifier, one or more modulation parameters of the at least one channel sounding waveform, and so forth. By way of example and without any limitation, a Zadoff-Chu (ZC) sequence in the time domain may be used for channel sounding. In another example, in the case of frequency domain processing, the sounding signal may be inserted before an inverse Fast Fourier Transform (iFFT) stage in the transmitter. Thus, parameters may include an identification of a modulation coding scheme e.g., a binary phase shift keying (BPSK) modulation coding scheme, a quadrature phase shift keying (QPSK) modulation coding scheme, a frequency modulation (FM) scheme, an amplitude modulation (AM) scheme, a frequency shift keying (FSK) scheme, a modulation coding scheme based upon a precoding matrix indicator, or a modulation coding scheme based upon precoder cycling. Higher level encoding schemes such as 16-QAM, 64-QAM, and the like may also be used in other examples.

In one example, the synchronization signal is modulated to include the information regarding the at least one channel sounding waveform. To illustrate, RF signals may be transmitted in a frequency or range of frequencies and extend for a certain duration of time and may have a certain RF energy. A drop of the transmission of the RF signals by the mobile channel sounding transmitter (e.g., a drop in the RF energy, such as to zero) may then be used as a timing indicator for the channel sounding receiver. However, the RF signals may be further modulated to include the information regarding an intended transmission of one or more channel sounding waveforms, e.g., the beam identifier, the characteristics of the channel sounding waveform, etc. Other types of modulation may be used such that the synchronization signal itself may include the additional information regarding the channel sounding waveform. In other words, the additional information may be embedded in the synchronization signal.

As mentioned above, the wireless side link may comprise an out-of-band wireless link, such as a cellular or non-cellular wireless communication session (e.g., an LTE-based or IEEE 802.11/Wi-Fi-based communication session), a communication session via non-restricted frequency resources (e.g., in ISM band(s)), or via frequency resources that are non-overlapping with frequency resources that are utilized for the actual channel sounding. In these examples, the synchronization signal (and additional information regarding one or more channel sounding waveforms) may alternatively or additionally be conveyed in data packets or other protocol data units (PDUs) (e.g., IP packets, TCP datagrams, Ethernet frames, Ethernet packets, etc., all of which may broadly be referred to herein as "packets" or PDUs) according to one or more communication protocols utilized for the communication session. For example, an LTE-based wireless communication session between a mobile channel sounding transmitter and channel sounding receiver may traverse at least one base station and other infrastructures of a cellular network. In such case, the mobile channel sounding transmitter and channel sounding receiver may measure network latency and may utilize the network latency to calculate an offset based upon the timing information of the synchronization signal.

In one example, the present disclosure may comprise mobile channel sounding transmitters and/or receivers that include multiple phased array antennas, e.g., where radio frequency (RF) components, such as power amplifiers, variable phase shifters, and transceivers that are integrated with the antennas elements of each phased array. In particular, examples of the present disclosure may provide a channel sounding system that may operate in one or more frequency bands for 5G communications, and which may determine measurements of wireless channel parameters (e.g., one or more "key performance indicators" (KPIs)), such as a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), and the like, along with spatial orientation information, such as azimuth and elevation angles, and locations associated with the measurements.

The channel sounding receiver may comprise a device that is equipped to operate according to the specification of the considered wireless cellular communications standard (e.g., 5G millimeter wave multiple-in multiple-out (MIMO)). In one example, the channel sounding receiver may include at least three phased array antennas arranged to provide a receive beam coverage across 360 degrees in azimuth, and may be configured with the ability to simultaneously beam sweep multiple receive beams for the respective phased array antennas to receive channel sounding waveforms from the mobile channel sounding transmitter and to determine measurements of wireless channel parameters based upon the channel sounding waveforms that are received. In other words, the at least three phased array antennas provide receive beams that are steerable so that for each azimuthal direction, at least one receive beam is steerable to include the azimuthal direction within the half-power beam width angular coverage of the at least one receive beam.

Antenna array geometry defines the placement of the antenna elements on the phased array antenna. For example, a uniform rectangular array (URA) geometry has antenna elements placed in a rectangular pattern with equal spacing between neighboring elements. Planar geometries such as the URA typically have a spatial region within which they can transmit or receive via a narrow beam (e.g., a half power beam width (HPBW) of less than 30 degrees angular spread, less than 15 degrees angular spread, less than 10 degrees angular spread, and so forth). In order to cover the entire 360 degree field of view in the azimuth plane around the receiver device, multiple planar phased array antennas may be arranged side-by-side. For instance, in one example, three planar phased array antennas may be arranged in a generally triangular layout. In another example, four planar phased array antennas may be arranged in a generally square or rectangular layout with each phased array antenna covering at least 90 degrees in azimuth. In such case, if the azimuth spatial coverage of each phased array antenna is greater than or equal to 90 degrees, the four phased array antennas can combine to cover all 360 degrees. Similarly, a configuration of three phased array antennas may cover the entire azimuth field of view as long as each phased array antenna has greater than or equal to 120 degrees of coverage. In another example, the present disclosure may utilize a cylindrical phased array antenna, with antenna elements placed either uniformly or non-uniformly on the face of the array. A complete cylinder with antenna elements on the surface can provide 360 degrees of azimuthal coverage. In another example, two half-cylinder phased array antennas can also provide similar coverage.

It should be noted that in various examples, the phased array antennas may have different fields-of-view in an elevation plane. For example, the phased array antennas may have a field of view in elevation of 120 degrees, 90 degrees, 60 degrees etc. The elevation field of view may be symmetric around the horizon (or a horizontal plane with respect to a device chassis) or may be offset, e.g., to provide greater coverage above or below a horizontal plane. For instance, the top edges of the phased array antennas may be angled towards each other, while the bottom edges of the phased array antennas may be angled away from each other. In another example, multiple phased array antennas may be arranged to provide 180 degrees of elevation coverage.

Appropriate control circuitry may also be paired with the phased array antennas. For example, if there are N phased array antennas, there may be N independent receive beams that can be utilized simultaneously. In one example, the receiver device may include N radio frequency (RF) front ends (including, for example: variable phase shifters, power amplifiers, diplexers or switches, downconverters, and the like) and N digital baseband units (which may include transceivers) to sense the signals received via the respective N phased array antennas simultaneously. A receiver device with the ability to capture N beams at the same time can sweep through the 360 degree field of view quickly by dividing the total azimuth field of view into N smaller coverage zones for each of the receive beams of the N phased array antennas.

In one example, the N signals coming out of the N phased array antennas can be fed into a single baseband receiver via a switch (or bank of switches). The switch(es) may be used to select one beam at any given time. In such an example, the receiver device may sweep the beams through their respective fields of view in a sequential manner, resulting in a slower sweep of the 360 degree field of view. By placing additional switches and baseband receivers, the number of baseband receivers can be set anywhere between 1 to N, in order to achieve a desired balance of cost, device size, performance speed, etc. In another example, each phased array antenna may be provided with its own dedicated RF front end.

It should be noted the mobile channel sounding transmitter may be similarly equipped with M phased arrays, M RF front ends, and 1-M digital baseband units. The mobile channel sounding transmitter and channel sounding receiver may each be equipped with analog-to-digital converters (ADCs) and digital-to-analog converters (DACs) (e.g., in the baseband units) which may define the operational range for channel sounding.

In accordance with the present disclosure, a channel sounding receiver may tag a wireless channel parameter measurement with directional/spatial orientation information, i.e., in addition to a location. In one example, the channel sounding receiver may calculate a direction, or spatial orientation of a receive beam with respect to a local coordinate system, e.g., a three dimensional space with dimensions/axis aligned to a length, a width, and a depth of the receiver device, for example. In yet another example, the channel sounding receiver may associate the angle of arrival (AoA) with a wireless channel parameter measurement (and a location), (e.g., where the wireless channel parameter measurement relates to a received power). In one example, the channel sounding receiver does not tag a wireless channel parameter measurement (e.g., received signal strength) with spatial orientation information, but rather tags spatial orientation information of a measurement with the location. For instance, at a given location, the primary direction from which the signal energy arrives is recorded, but not the actual received signal strength.

In one example, locations, or geographic positions may be determined at the channel sounding receiver device via a Global Positioning System (GPS) receiver, or may be derived using other location estimation methods, such as cell identifier (cell ID) based methods, observed time difference of arrival (OTDA) techniques, or barycentric triangulation. In this regard, it should be noted that any references herein to a channel sounding receiver may comprise a mobile channel sounding receiver, i.e., a device that is portable and which can be moved from location to location. For instance, a mobile channel sounding receiver may be moved with relative ease, such as one that may be carried by a person or wheeled on a small cart that may be pushed or pulled by a person. In addition, the orientation of the channel sounding receiver may be determined from a gyroscope and compass, allowing the channel sounding receiver device to determine a receive beam direction/spatial orientation, and to therefore measure wireless channel parameters with high spatial accuracy.

In should also be noted that in some examples (e.g., for examples where the synchronization signal is conveyed wirelessly between the mobile channel sounding transmitter and the channel sounding receiver without traversing any other network infrastructures, or peer-to-peer) the location of the channel sounding receiver may also be used by the mobile channel sounding transmitter to transmit the synchronizations signal. To illustrate, the channel sounding receiver may report its location to the mobile channel sounding transmitter. In one example, the channel sounding receiver may report the location via the wireless side link. For instance, the wireless side link may comprise an in-band or out-of-band wireless link for establishing a bidirectional communication session between the mobile channel sounding transmitter and the channel sounding receiver. Thus, the wireless side link may convey a synchronization signal (and in one example, information regarding the channel sounding waveform) in addition to conveying location information and other communications between the channel sounding receiver to the mobile channel sounding transmitter.

In addition, the mobile channel sounding transmitter may determine its own location in the same or a similar manner as the channel sounding receiver and may calculate a direction (and in one example, a distance) between the mobile channel sounding transmitter and the channel sounding receiver. The mobile channel sounding transmitter may then send the synchronization signal using one or more phased arrays in the direction of the channel sounding receiver. The mobile channel sounding transmitter may transmit with a relatively focused beam, e.g., with a HPBW of 15 degrees or less, or with a broader beam e.g., up to 60 to 90 degrees of HPBW centered on the direction of the channel sounding receiver, up to 120 degrees, etc.

It should also be noted that in one example, the wireless side link may be used to coordinate between the channel sounding receiver and the mobile channel sounding transmitter. For instance, the channel sounding receiver may use the wireless side link to communicate to the mobile channel sounding transmitter that the channel sounding receiver is deployed in a location and ready to receive channel sounding waveforms and measure wireless channel parameters. The mobile channel sounding transmitter may then transmit one or more synchronization signals. In one example, the channel sounding receiver may transmit a confirmation that it has received the synchronization signal and is synchronized with the transmitter before the transmitter begins sending the channel sounding waveform(s). Similarly, if the channel sounding receiver is measuring over multiple receive beam directions for multiple transmit beam directions, the channel sounding receiver may signal to the mobile channel sounding transmitter that measurements for a sequence of beams is completed. In addition, if the channel sounding receiver is not able to obtain certain measurements, e.g., for reasons other than poor wireless channel conditions (such as due to a processing problem on-board the channel sounding receiver, a physical disturbance (e.g., a technician bumping into the channel sounding receiver), etc.), the channel sounding receiver may signal to the mobile channel sounding transmitter over the wireless side link to request a resynchronization. For instance, the mobile channel sounding transmitter may send one or more synchronization signals, in one example the channel sounding receiver may confirm synchronization to the synchronization signal, the mobile channel sounding transmitter may retransmit one or more channel sounding waveforms for which the measurements were not previously obtained, and so on.

In one example, the channel sounding receiver may store one or more wireless channel parameter measurements in a record, along with the spatial orientation information and a location associated with the wireless channel parameter measurements, e.g., in a local memory. In one example, the channel sounding receiver may be deployed to obtain wireless channel parameter measurements at various locations within an environment and may collect and store all of the measurements. The measurements may then be retrieved at a later time and transferred to another device or system for storage and/or analysis. For instance, similar data from the mobile channel sounding transmitter regarding the transmit beam(s), the channel sounding waveforms, the location(s) of the mobile channel sounding transmitter, etc. may be uploaded to the same device or system and correlated with the measurements of the channel sounding receiver. In another example, the measurements from the channel sounding receiver may be transferred to the mobile channel sounding transmitter for storage and/or analysis. This can be done after obtaining a series of measurements, e.g., via a cable connection when the mobile channel sounding transmitter and receiver are together in a same location. However, in another example, all or a portion of the wireless channel parameter measurements may be transmitted wirelessly by the channel sounding receiver to the mobile channel sounding transmitter via the wireless side link. In one example, the channel sounding receiver may indicate to the mobile channel sounding transmitter that it has one or more records of wireless channel parameter measurements ready for transmission and the mobile channel sounding transmitter may confirm that it is ready to receive the measurements. For example, the channel sounding receiver may allocate a limited amount of memory and/or storage for the records of wireless channel parameter measurements. Accordingly, in one example the receiver device may indicate to the mobile channel sounding transmitter to transfer the record(s) of wireless channel parameter measurements before the allocated memory and/or storage capacity is reached. It should be noted that all of these communications may occur between the mobile channel sounding transmitter and the channel sounding receiver via the wireless side link. These and other aspects of the present disclosure are discussed in greater detail below in connection with the examples of FIGS. 1-5.

To better understand the present disclosure, FIG. 1 illustrates an example network, or system 100 in which examples of the present disclosure for synchronizing a mobile channel sounding transmitter and a channel sounding receiver via a wireless side link may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the channel sounding receiver 120 and the channel sounding transmitter 125 (e.g., a mobile channel sounding transmitter) may be used to determine a plurality of measurements of at least one wireless channel parameter (broadly, "channel sounding"). In one example, channel sounding receiver 120 may comprise a user equipment, e.g., a mobile endpoint device comprising a cellular telephone, a smartphone, a tablet computing device, a laptop computer, or any other cellular-capable mobile telephony and computing devices. In one example, channel sounding receiver 120 may comprise a dedicated channel sounding device. Similarly, the channel sounding transmitter 125 may comprise a dedicated channel sounding device.

In one example, the channel sounding transmitter 125 may comprise a switched antenna array with transmitting antennas having different orientations, e.g., a curved array. For instance, in one example, a switched antenna array to transmit wireless test signals may have seven transmitting antennas, each antenna oriented to cover 18.5 degrees of azimuth at half-power beamwidth, which may cover a total of 120 degrees in azimuth (with a small overlap in beamwidth for adjacent antennas in the array). In one example, the channel sounding transmitter 125 may comprise one or more phased antenna arrays (e.g., a quantity of M phased arrays), M RF front ends, and 1-M digital baseband units. In one example, the channel sounding transmitter 125 may transmit channel sounding signals (also referred to as "channel sounding waveforms") for reception and measurement of wireless channel parameters by the channel sounding receiver 120. In general, the channel sounding waveforms may have a variety of characteristics, such as those described above, that may be specified by the channel sounding transmitter 125 (and/or by an operator thereof).

In one example, the channel sounding receiver 120 may be used to receive channel sounding waveforms that are transmitted in an environment from the channel sounding transmitter 125, where the channel sounding waveforms, as received, may be used to calculate or determine the measures of various wireless channel parameters such as: a complex impulse response, a path loss, an RSS, a CIR, an excess delay, an RMS delay spread, an angular spread, a Doppler spread, a fade rate, an AoA, and so forth. For illustrative purposes, the "wireless channel(s)" for which the channel sounding receiver 120 is obtaining channel sounding waveforms and measuring wireless channel parameters may be indicated by reference numeral 190 in FIG. 1.

In one example, the channel sounding receiver 120 includes a plurality of phased array antennas that may be activated and deactivated according to a schedule or otherwise synchronized to the transmission of channel sounding waveforms. In one example, each phased array antenna may be paired with an RF front end to receive radio frequency (RF) signals from the respective phased array antenna and convert the signals into baseband signals. A digital sampling unit (e.g., an analog-to-digital converter (ADC) of a baseband processing unit) may convert the baseband signals into digital representations of the channel sounding waveforms that are received via the respective phased array antennas. For instance, the digital sampling units may oversample the analog baseband signals at a sampling interval under the control of timing signals from a clock circuit to create the digital representations of the channel sounding waveforms. In one example, each phased array may cover 90-120 degrees in azimuth, 90-180 degrees in elevation, etc., and the phased arrays may collectively cover 360 degrees in azimuth and 180 degrees in elevation (or greater, e.g., to account for angles below horizon).

In one example, the baseband processing units may output the digital representations of the channel sounding waveforms to a processor unit that is configured to perform various operations for determining measures of wireless channel parameters, as described herein. For instance, the channel sounding receiver 120 may calculate, based upon the digital representations of the channel sounding waveforms, a phase difference between channel sounding waveforms received via respective antennas. The processor unit may further determine an angle of arrival (AoA) based upon the antenna positions and the phase difference.

In one example, the channel sounding receiver 120 may receive a reference copy or copies of the channel sounding waveforms(s) and/or a set of parameters characterizing the channel sounding waveforms, from the channel sounding transmitter 125. Accordingly, the channel sounding receiver 120 may determine a carrier-to-interference ratio (CIR) by comparing a sequence received via one of the phased array antennas with a reference copy. Similarly, the channel sounding receiver 120 may calculate a complex impulse response, a path loss, an RSS, a CIR, an excess delay, an RMS delay spread, an angular spread, a Doppler spread, a fade rate, an AoA, or the like, from the digital representations of the channel sounding waveforms.

As described above, the channel sounding transmitter 125 and the channel sounding receiver 120 may establish a wireless side link for exchanging timing information (broadly, a synchronization signal) as well as for conveying information regarding the channel sounding waveform (e.g., a reference copy and/or modulation parameters, beam information, etc.). To illustrate, a wireless side link may include a communication session via cellular network infrastructure, e.g., including at least wireless links 192 and 193. Alternatively, the wireless side link may comprise a wireless communication session via a non-cellular wireless networking protocol, such as IEEE 802.11/Wi-Fi, or the like, or via a wireless communication session in accordance with a set of non-restricted frequency resources (e.g., using ISM band frequencies). In such examples, the non-cellular wireless communication session may include an access point (AP) coordinator (not shown) and/or a peer-to-peer session (represented by wireless link 191 in FIG. 1). In addition, in such examples, the non-cellular wireless link(s) may comprise out-of-band wireless links (which use different frequencies from the channel sounding waveforms and the "wireless channel(s)" 190. In examples where the wireless side link comprises an out-of-band wireless link, the channel sounding receiver 120 and the channel sounding transmitter 125 may use a different set of antennas, RF front ends, and/or baseband units than those which are used for channel sounding/channel property measurements in accordance with the present disclosure.

In still another example, wireless link 190 may represent an in-band wireless link, which may share the same frequency resources as the channel sounding waveforms and/or the "wireless channel(s)" 190, but which may utilize different time resources (different time blocks). For instance, the channel sounding waveforms may be for millimeter wave frequencies (30 GHz to 300 GHz) as carrier frequencies, where the wireless side link utilizes the same set of frequencies or frequency bands.

The wireless side link may be used to transmit a synchronization signal by the channel sounding transmitter 125, in addition to other information regarding one or more channel sounding waveforms, such as reference copies or parameters thereof, beam information, timing information, etc. The wireless side link may also be used by the channel sounding receiver 120 to notify the channel sounding transmitter 125 that the channel sounding receiver 120 is in position and ready to measure, to confirm that a clock circuit of the channel sounding receiver 120 is matched to the synchronization signal, to confirm successful measurements to the channel sounding transmitter 125 or to indicate one or more failed measurements, to report the measurements to the channel sounding transmitter 125, and so forth.

In one example, the channel sounding receiver 120 and channel sounding transmitter 125 may each comprise all or a portion of a computing device or system, such as computing system 500, and/or processing system 502 as described in connection with FIG. 5 below, and may be configured to provide one or more functions for synchronizing a mobile channel sounding transmitter and a channel sounding receiver via a wireless side link, and for performing various other operations in accordance with the present disclosure. For instance, channel sounding transmitter 125 may be configured to perform functions such as those described below in connection with the example method 300 of FIG. 3. Similarly, channel sounding receiver 120 may be configured to perform functions such as those described below in connection with the example method 400 of FIG. 4.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure, such as a network-based secure data storage for wireless channel parameter measurement records. For instance, channel sounding receiver 120 and/or channel sounding transmitter 125 may forward measurements of wireless channel parameters from channel sounding receiver 120 to AS 145 for storage. Either or both of channel sounding receiver 120 and channel sounding transmitter 125 may also forward additional data to AS 145 for storage, such as reference copies of the channel sounding waveform(s) and/or parameters thereof, transmit beam information, time stamp information, location information of the channel sounding receiver 120 and channel sounding transmitter 125, and so forth. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, channel sounding may utilize multiple channel sounding receivers to receive channel sounding signals/waveforms from channel sounding transmitter 125. Similarly, multiple mobile channel sounding transmitters may be utilized for channel sounding in conjunction with channel sounding receiver 120 and/or multiple channel sounding receivers.

In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 145 of FIG. 1 may represent an application function (AF) for adjusting aspects of a cellular network in response to measurements of wireless channel parameters by a receiver device, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
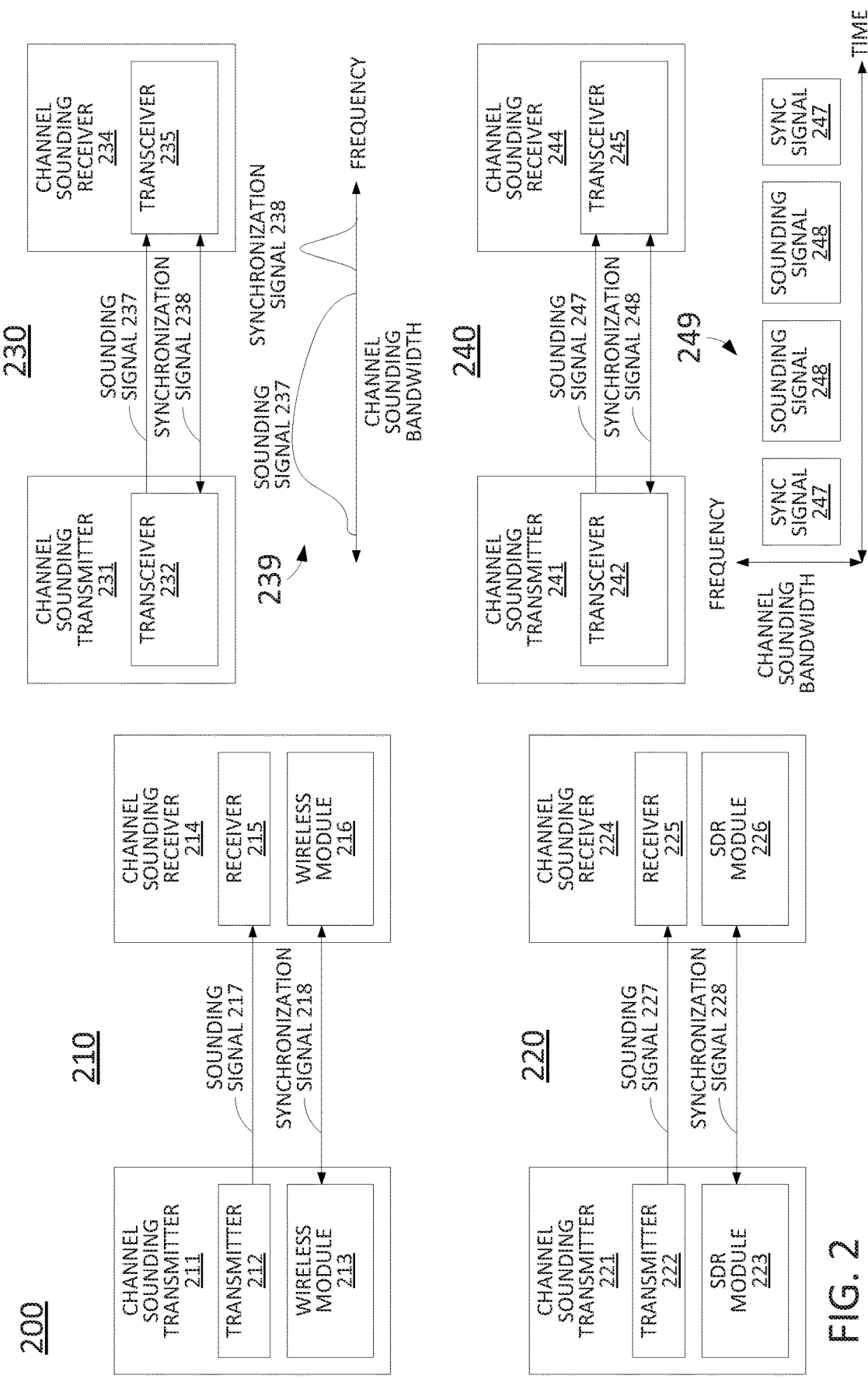
FIG. 2 illustrates an example translation of spatial orientation information of a local coordinate system with respect to a mobile endpoint device into spatial orientation information in a global coordinate system, in accordance with the present disclosure.

FIG. 2 illustrates examples of synchronizing a mobile channel sounding transmitter and a channel sounding receiver via a wireless side link. In a first example, a channel sounding system 210 includes a channel sounding transmitter 211 (e.g., a mobile channel sounding transmitter) and a channel sounding receiver 214. The channel sounding transmitter 211 transmits a sounding signal 217 (e.g., a channel sounding signal, or channel sounding waveform) via transmitter 212 which may be received by channel sounding receiver 214 via receiver 215. The transmitter 212 may comprise components for radio transmission in a frequency band of interest, such as a digital baseband unit, a digital to analog conversion unit, a baseband to RF upconversion unit, one or more antennas and/or antenna arrays, and so forth. Similarly, the receiver 215 may comprise one or more antennas and/or antenna arrays, an RF to baseband conversion unit, an analog to digital conversion unit, a digital baseband unit, and so forth. In one example, the transmitter 212 and receiver 215 may comprise transceivers equipped for both transmission and reception of RF signals. For instance, transmitter 212 and receiver 215 may include upconversion/downconversion units, analog-to-digital and digital-to-analog conversion units, and so forth.

The channel sounding transmitter 211 and channel sounding receiver 214 may establish a wireless side link which may be used to convey synchronization signal 218 (in addition to additional information regarding one or more channel sounding waveforms and/or other communications to coordinate between the channel sounding transmitter 211 and the channel sounding receiver 214). In the present example, the wireless side link may comprise a cellular or non-cellular communication session between wireless modules 213 and 216. For instance, wireless modules 213 and 216 may comprise IEEE 802.11/Wi-Fi transceivers to establish a Wi-Fi communication session, or may comprise cellular transceivers (e.g., LTE transceivers) to establish a cellular communication session. In such an example, the wireless side link for conveying the synchronization signal 218 (and in some cases, additional information regarding the channel sounding signal 217 and/or other communications) may include or may traverse cellular network infrastructure, such as a base station, a serving gateway, etc., or equipment providing an IEEE 802.11 network, such as a wireless router or access point (AP).

In a second example, a channel sounding system 220 includes a channel sounding transmitter 221 (e.g., a mobile channel sounding transmitter) and a channel sounding receiver 224. The channel sounding transmitter 221 transmits a sounding signal 227 (e.g., a channel sounding signal, or channel sounding waveform) via transmitter 222 which may be received by channel sounding receiver 224 via receiver 225. The transmitter 222 and the receiver 225 may comprise the same or similar components as transmitter 212 and receiver 215 of the channel sounding system 210. In addition, the channel sounding transmitter 221 and channel sounding receiver 224 may establish a wireless side link which may be used to convey synchronization signal 228 (in addition to additional information regarding one or more channel sounding waveforms and/or other communications to coordinate between the channel sounding transmitter 221 and the channel sounding receiver 224). In the present example, the wireless side link may comprise a communication session between the mobile channel sounding transmitter and the channel sounding receiver in accordance with a set of non-restricted frequency resources (e.g., using one or more ISM bands). For instance, channel sounding transmitter 221 and channel sounding receiver 224 may comprise software defined radio (SDR) modules 223 and 226, respectively, to establish the communication session. Similar to the channel sounding system 210, the channel sounding signal 227 utilizes a different set of time and frequency resources than the synchronization signal 228.

In a third example, a channel sounding system 230 includes a channel sounding transmitter 231 (e.g., a mobile channel sounding transmitter) and a channel sounding receiver 234. The channel sounding transmitter 231 transmits a sounding signal 237 (e.g., a channel sounding signal, or channel sounding waveform) via transceiver 232. The transceiver 232 may comprise the same or similar components as transmitters 212 and 222 of channel sounding systems 210 and 220, respectively. The sounding signal 237 may be received by channel sounding receiver 234 via transceiver 235, which may comprise the same or similar components as receivers 215 and 225 of channel sounding systems 210 and 220, respectively. In addition, the channel sounding transmitter 231 and channel sounding receiver 234 may establish an out-of-band wireless link via transceivers 232 and 235 using frequency resources that are within an operational bandwidth of the transceivers 232 and 235 that are used for channel sounding, but outside of the frequencies within the operational bandwidth that are used for the channel sounding signal 237. For instance, the graph 239 illustrates one example of the sounding signal 237 and synchronization signal 238 with the channel sounding bandwidth (e.g., the operational range of the transceivers 232 and 235 and/or the operational range of the transceivers 232 and 235 subject to any constraints such as permitted use of certain frequencies or frequency bands within the geographic region where the channel sounding system 230 is used).

In a fourth example, a channel sounding system 240 includes a channel sounding transmitter 241 (e.g., a mobile channel sounding transmitter) and a channel sounding receiver 244. The channel sounding transmitter 241 transmits a sounding signal 247 (e.g., a channel sounding signal, or channel sounding waveform) via transceiver 242. The transceiver 242 may comprise the same or similar components as transmitters 212, 222, and/or transceiver 232 of channel sounding systems 210, 220, and 230, respectively. The sounding signal 247 may be received by channel sounding receiver 244 via transceiver 245, which may comprise the same or similar components as receivers 215, 225, and/or transceiver 235 of channel sounding systems 210, 220 and 230, respectively. In addition, the channel sounding transmitter 231 and channel sounding receiver 234 may establish an in-band wireless link via transceivers 242 and 245 which uses the same frequency resources as are used for the channel sounding signal 247 but which utilizes different, non-overlapping time slots from the channel sounding signal 247. For instance, the graph 249 illustrates one example of the sounding signal 247 and synchronization signal 248 with a time/frequency grid which may be utilized by the channel sounding system 240.

It should be noted that although the channel sounding signals 217, 227, 237, and 247 and the synchronization signals 218, 228, 238, and 248 are referred to in the singular form, it should be understood that the respective systems 210, 220, 230, and 240 may utilize a plurality of channel sounding signals and/or a plurality of synchronization signals, which may be of the same form, or which may have different forms. Similarly, the graphs 239 and 249 may have different forms, such as synchronization signal 238 utilizing lower frequencies and the sounding signal 237 utilizing higher frequencies within the channel sounding bandwidth and/or operational range of the transceivers 232 and 235, additional channel sounding signal(s) 248 between successive synchronization signal(s) 247, and so forth. In addition, it should be understood that any of the channel sounding receivers 214, 224, 234, and 244 may similarly comprise mobile channel sounding receivers that may be portable and which may be moved from location to location with relative ease. Thus, these and other modifications are all contemplated within the scope of the present disclosure.

Figure 3:
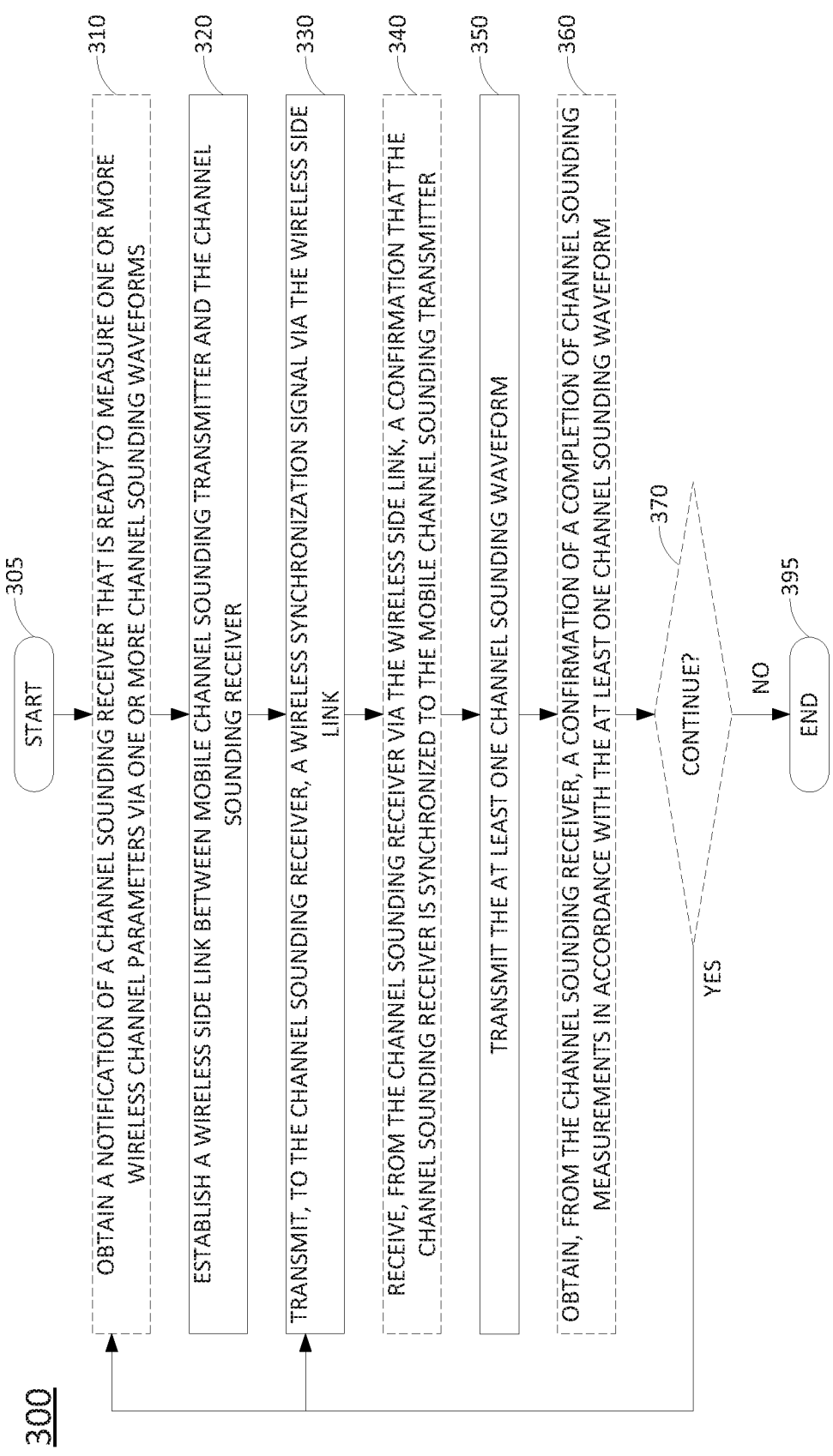
FIG. 3 illustrates a flowchart of an example method for synchronizing a mobile channel sounding transmitter and a channel sounding receiver via a wireless side link.

FIG. 3 illustrates a flowchart of an example method 300 for synchronizing a mobile channel sounding transmitter and a channel sounding receiver via a wireless side link, in accordance with the present disclosure. In one example, steps, functions and/or operations of the method 300 may be performed by a device as illustrated in FIG. 1, e.g., a channel sounding transmitter, or any one or more components thereof, such as a processing system, one or more transceivers, one or more antennas or antenna arrays (e.g., a phased array antenna), and so forth. In accordance with the present disclosure a processing system may include one or more processors, which can include CPUs, PLDs, or a combination thereof. For instance, a processing system may include central processing unit, a digital baseband unit, and so forth. In one example, the steps, functions, or operations of method 300 may be performed by a computing device or system 500, and/or a processing system 502 as described in connection with FIG. 5 below. For instance, the computing device 500 may represent at least a portion of a mobile channel sounding transmitter in accordance with the present disclosure. For illustrative purposes, the method 300 is described in greater detail below in connection with an example performed by a processing system. The method 300 begins in step 305 and may proceed to optional step 310 or to step 320.

At optional step 310, the processing system (e.g., of a mobile channel sounding transmitter) may obtain a notification of a channel sounding receiver that is ready to measure one or more wireless channel parameters via one or more channel sounding waveforms. The notification may comprise a manual input from an operator, such as pressing a button, entering a command via a graphical user interface or command line, and so forth, or may comprise a wireless communication from a channel sounding receiver. For instance, the channel sounding receiver may utilize an in-band or out-of-band signal to indicate the presence of the channel sounding receiver and an intention to establish a wireless side link. In one example, the notification may include estimated or general location information of the channel sounding receiver such that the processing system may determine the general direction of the channel sounding receiver in relation of the mobile channel sounding transmitter, e.g., within a 60-90 degree range within a 120 degree range, etc.

At step 320, the processing system establishes a wireless side link between the mobile channel sounding transmitter and the channel sounding receiver. For example, the wireless side link may comprise an out-of-band wireless link, which may include a communication session between the mobile channel sounding transmitter and the channel sounding receiver via a cellular network. In such an example, at least one channel sounding waveform is transmitted (e.g., at step 350) via a first set of time and frequency resources that is different from a second set of time and frequency resources that is utilized by the cellular network.

In one example, the out-of-band wireless link may comprise a communication session between the mobile channel sounding transmitter and the channel sounding receiver in accordance with a non-cellular wireless networking protocol, such as a wireless local area network protocol (e.g., IEEE 802.11, or the like), or a wireless peer-to-peer protocol (e.g., IEEE 802.15, Bluetooth, ZigBee, etc.). In such an example, the at least one channel sounding waveform is transmitted (e.g., at step 350) via a set of frequency resources that is different from a set of frequency resources that is utilized by the non-cellular wireless networking protocol.

In one example, the out-of-band wireless link comprises a communication session between the mobile channel sounding transmitter and the channel sounding receiver in accordance with a set of non-restricted frequency resources. For instance, the set of non-restricted frequency resources may comprise at least a portion of an industrial, scientific, and medical (ISM) radio band. In such an example, the at least one channel sounding waveform is transmitted (e.g., at step 350) via a set of frequency resources that is different from the set of non-restricted frequency resources. In all of the foregoing examples, at least one channel sounding waveform may be transmitted (e.g., at step 350) via a first transceiver of the mobile channel sounding transmitter, and the wireless side link may be established via a second transceiver of the mobile channel sounding transmitter that is different from the first transceiver. In addition, the channel sounding receiver may also use different receivers (e.g., different transceivers) for wireless side link and channel sounding waveform(s).

In one example, the out-of-band wireless link comprises a communication session between the mobile channel sounding transmitter and the channel sounding receiver in accordance with first set of frequency resources, where at least one channel sounding waveform is transmitted (e.g., at step 350 discussed below) via a second set of frequency resources that is different from the first set of frequency resources, and where both the first set of frequency resources and the second set of frequency resources are within an operational bandwidth of a transceiver of the mobile channel sounding transmitter. For instance, the at least one channel sounding waveform is transmitted via the transceiver (e.g., at step 350), and the wireless side link is also established via the transceiver (e.g., at step 320). Similarly, both the first set of frequency resources and the second set of frequency resources may be within an operational bandwidth of a receiver/transceiver of the channel sounding receiver.

In another example, the wireless side link comprises an in-band wireless link, where the in-band wireless link comprises a communication session via a first set of time and frequency resources, where the first set of time and frequency resources comprises a first set of frequencies and a first set of time slots, and where the at least one channel sounding waveform is transmitted (e.g., at step 350) via a second set of time and frequency resources, where the second set of time and frequency resources comprises the first set of frequencies and a second set of time slots, and where the time slots of the second set of time slots are non-overlapping with the time slots of the first set of time slots.

At step 330, the processing system transmits, to the channel sounding receiver, a wireless synchronization signal via the wireless side link. For example, as discussed above, the synchronization signal may convey clock timing information of the mobile channel sounding transmitter. In one example, the synchronization signal further conveys information regarding the at least one channel sounding waveform (to be transmitted at step 350), such as a transmit beam identifier, at least one modulation parameter of the channel sounding waveform, or timing information of the at least one channel sounding waveform. The timing information may be relative timing information of the at least one channel sounding waveform with respect to the synchronization signal, or can be "absolute" where the absolute time is determinable by the channel sounding receiver by first synching to the synchronization signal. The information regarding the at least one channel sounding waveform may further include an angle of departure (AoD) and/or may include the shape of the waveform, e.g., return-to-zero (RZ), non-return-to-zero (NRZ), a frequency or range of frequencies, the duration of the waveform, etc. In an example where the wireless side link comprises an out-of-band wireless link, the additional information may be obtained via one or more packets via the out-of-band wireless link.

At optional step 340, the processing system may receive, from the channel sounding receiver via the wireless side link, a confirmation that the channel sounding receiver is synchronized to the mobile channel sounding transmitter (in other words, that the channel sounding receiver is synchronized to the wireless synchronization signal). In one example, the confirmation may be understood between the channel sounding receiver and the processing system (of the mobile channel sounding transmitter) to be valid for a certain duration of time, after which a resynchronization may be performed before further channel sounding may occur.

At step 350, the processing system transmits the at least one channel sounding waveform, e.g., via one or more antennas of the mobile channel sounding transmitter. In one example, the channel sounding waveforms are transmitted via at least one directional antenna, e.g., a phased array antenna for beamforming. Thus, each of the channel sounding waveforms may be associated with a particular transmit beam or transmit beam direction (in azimuth and elevation). The at least one channel sounding waveform may be transmitted in accordance with any of the time and/or frequency resources as described above and may have any of the additional properties as described above and which may be conveyed to the channel sounding receiver via the wireless side link and/or embedded in the wireless synchronization signal as described above.

At optional step 360, the processing system may obtain, from the channel sounding receiver, a confirmation of a completion of channel sounding measurements in accordance with the at least one channel sounding waveform. In one example, optional step 360 may include obtaining the wireless channel properties/measurements from the channel sounding receiver (e.g., via the wireless side link). For instance, the mobile channel sounding transmitter may aggregate measurements from the channel sounding receiver at a plurality of different locations and/or orientation for combining measurements, for generating coverage maps, for storage and uploading to another device for analysis, and so forth.

At optional step 370, the processing system may determine whether to continue. For instance, if there are more measurements to be made with the channel sounding receiver at the same location and/or orientation, or at a different location and/or orientation, or if there are more measurements to be made with the mobile channel sounding transmitter at a different location and/or orientation, and/or with a different angle of departure, with different channel sounding waveform(s), etc., then the method may return to step 310 or to step 330. To illustrate, the mobile channel sounding transmitter may be moved to a different location and/or orientation and may again identify a channel sounding receiver ready to perform channel sounding measurements, may establish a wireless side link (or reestablish a wireless side link, if the wireless side link was lost or released after the first iteration of the method 300), may transmit a synchronization signal, may receive confirmation that the channel sounding receiver is synchronized, may transmit one or more channel sounding waveforms, and so forth. Otherwise, the method 300 may proceed to step 395 where the method ends.

It should be noted that the method 300 may be expanded to include additional steps, or may be modified to replace steps with different steps, to combine steps, to omit steps, to perform steps in a different order, and so forth. For example, the method 300 is described in connection with a single channel sounding receiver. However, in another example, multiple channel sounding receivers may establish wireless side links with the processing system (of the mobile channel sounding transmitter) and engage in channel sounding (measuring properties of the wireless channel in accordance with the channel sounding waveform(s)) simultaneously and/or in a sequence while deployed at different locations in an environment of interest. In another example, the method 300 may involve returning to steps 330 and/or 340 to resynchronize, e.g., if more than a certain period of time has passed after which the synchronization of the channel sounding receiver with the mobile channel sounding transmitter is no longer guaranteed. Thus, these and other modifications are all contemplated within the scope of the present disclosure.

Figure 4:
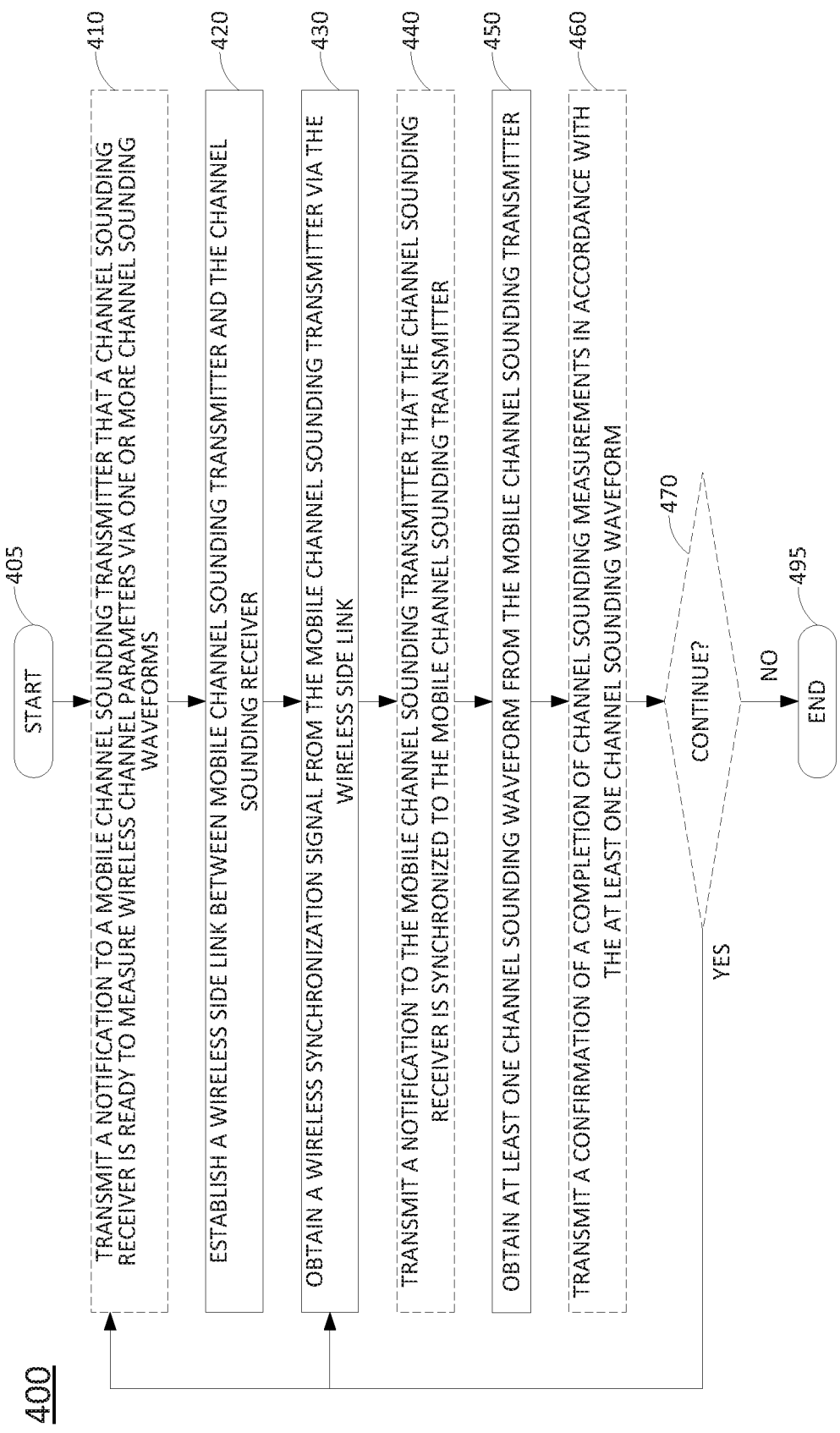
FIG. 4 illustrates a flowchart of an additional example method for synchronizing a mobile channel sounding transmitter and a channel sounding receiver via a wireless side link.

FIG. 4 illustrates a flowchart of an additional example method 400 for synchronizing a mobile channel sounding transmitter and a channel sounding receiver via a wireless side link, in accordance with the present disclosure. In one example, steps, functions and/or operations of the method 400 may be performed by a device as illustrated in FIG. 1, e.g., a channel sounding receiver, or any one or more components thereof, such as a processing system, one or more transceivers, one or more antennas or antenna arrays (e.g., a phased array antenna), a GPS unit, and so forth. In accordance with the present disclosure a processing system may include one or more processors, which can include CPUs, PLDs, or a combination thereof. For instance, a processing system may include central processing unit, a digital baseband unit, and so forth. In one example, the steps, functions, or operations of method 400 may be performed by a computing device or system 500, and/or a processing system 502 as described in connection with FIG. 5 below. For instance, the computing device 500 may represent at least a portion of a channel sounding receiver in accordance with the present disclosure. For illustrative purposes, the method 400 is described in greater detail below in connection with an example performed by a processing system. The method 400 begins in step 405 and may proceed to optional step 410 or to step 420.

At optional step 410, the processing system (e.g., of a channel sounding receiver) may transmit a notification to a mobile channel sounding transmitter that the channel sounding receiver is ready to measure wireless channel parameters via one or more channel sounding waveforms. In one example, optional step 410 may comprise receiver-side complementary operations to those described above in connection with optional step 310 of the method 300.

At step 420, the processing system establishes a wireless side link between the mobile channel sounding transmitter and the channel sounding receiver. For instance, the wireless side link may comprise an out-of-band wireless link as described above, such as a communication session via a cellular network, a communication session in accordance with a non-cellular wireless networking protocol, or a communication session in accordance with a set of non-restricted frequency resources, or may comprise an out-of-band signal that is within a operational bandwidth of a transceiver that is used for channel sounding but which utilizes frequency resources that are not used for channel sounding. In another example, the wireless side link may comprise an in-band wireless link, but may utilize different time and frequency resources than those that are used for channel sounding. In one example, step 420 may comprise receiver-side complementary operations to those described above in connection with step 320 of the method 300.

At step 430, the processing system obtains a wireless synchronization signal from the mobile channel sounding transmitter via the wireless side link. As described above, in one example, the synchronization signal may be modulated to include additional information regarding the at least one channel sounding waveform. In an example where the wireless side link comprises an out-of-band wireless link, the additional information may be obtained via one or more packets via the out-of-band wireless link. In one example, optional step 430 may comprise receiver-side complementary operations to those described above in connection with step 330 of the method 300.

At optional step 440, the processing system may transmit a notification to the mobile channel sounding transmitter that the processing system (of the channel sounding receiver) is synchronized to the mobile channel sounding transmitter (in other words, that the channel sounding receiver is synchronized to the wireless synchronization signal). In one example, the confirmation may be understood between the mobile channel sounding transmitter and the processing system (of the channel sounding receiver) to be valid for a certain duration of time, after which a resynchronization may be performed before further channel sounding may occur.

At step 450, the processing system obtains at least one channel sounding waveform from the mobile channel sounding transmitter. For instance, the processing system may receive the at least one channel sounding waveform via one or more antennas, or antenna arrays (e.g., one or more phased arrays). The at least one channel sounding waveform may be transmitted in accordance with any of the time and/or frequency resources as described above and may have any of the additional properties as described above and which may be obtained by the processing system from the mobile channel sounding transmitter via the wireless side link and/or embedded in the wireless synchronization signal as described above.

In one example, step 450 may include performing at least one measurement of at least one parameter of the wireless channel in accordance with the at least one channel sounding waveform. For instance, the at one wireless channel parameter may comprise one or more of: a complex impulse response, a path loss, a RSS, an excess delay, an RMS delay spread, an angular spread, a Doppler spread, a fade rate, an angle of arrival (AoA), and so forth. In one example, the processing system may tag and/or store measurements with additional data, such as a location of the channel sounding receiver, an orientation of the channel sounding receiver, a timestamp, and so forth.

At optional step 460, the processing system may transmit a confirmation of a completion of channel sounding measurements in accordance with the at least one channel sounding waveform (e.g., via the wireless side link). In one example, optional step 460 may include transmitting the wireless channel properties/measurements to the mobile channel sounding transmitter. For instance, the mobile channel sounding transmitter may aggregate measurements from the channel sounding receiver at a plurality of different locations and/or orientation for combining measurements, for generating coverage maps, for storage and uploading to another device for analysis, and so forth.

At optional step 470, the processing system may determine whether to continue. For instance, if there are more measurements to be made with the channel sounding receiver at the same location and/or orientation, or at a different location and/or orientation, or if there are more measurements to be made with the mobile channel sounding transmitter at a different location and/or orientation, and/or with a different angle of departure, with different channel sounding waveform(s), etc., then the method may return to step 410 or to step 430. To illustrate, the channel sounding receiver may be moved to a different location and/or orientation and may again notify a mobile channel sounding transmitter that the channel sounding receiver is ready to perform channel sounding measurements, may establish a wireless side link (or reestablish a wireless side link, if the wireless side link was lost or released after the first iteration of the method 400), may receive a synchronization signal, may transmit confirmation that the channel sounding receiver is synchronized, may receive one or more channel sounding waveforms, and so forth. Otherwise, the method 400 may proceed to step 495 where the method ends.

It should be noted that the method 400 may be expanded to include additional steps, or may be modified to replace steps with different steps, to combine steps, to omit steps, to perform steps in a different order, and so forth. For example, the method 400 is described in connection with a single mobile channel sounding transmitter. However, in another example, multiple mobile channel sounding transmitters may establish wireless side links with the processing system (of the channel sounding receiver) and engage in transmitting channel sounding waveform(s) while deployed at different locations in an environment of interest. In another example, the method 400 may involve returning to steps 430 and/or 440 to resynchronize, e.g., if more than a certain period of time has passed after which the synchronization of the channel sounding receiver with the mobile channel sounding transmitter is no longer guaranteed. Thus, these and other modifications are all contemplated within the scope of the present disclosure.

In addition, although not specifically specified, one or more steps, functions, or operations of the method 300 or the method 400 may include a storing, displaying, and/or outputting step as required for a particular application. In other words, any data, records, fields, and/or intermediate results discussed in the method(s) can be stored, displayed, and/or outputted either on the device executing the method(s) or to another device, as required for a particular application. Furthermore, steps, blocks, functions or operations in FIG. 3 or FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 5:
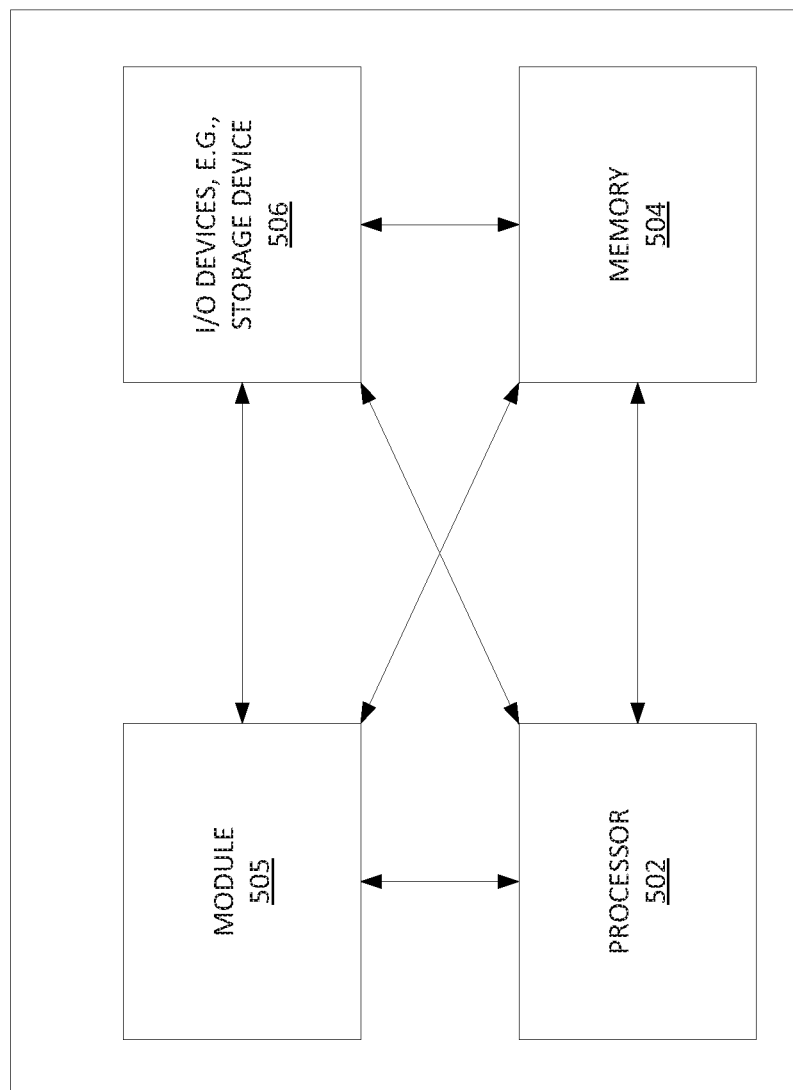
FIG. 5 illustrates an example of a computing device, or computing system, specifically programmed to perform the steps, functions, blocks, and/or operations described herein.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for synchronizing a mobile channel sounding transmitter and a channel sounding receiver via a wireless side link, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, antenna arrays, remote radio heads (RRHs), baseband units (BBUs), transceivers, power units, GPS units, and so forth. Although only one processor element is shown, it should be noted that the computing device may employ a plurality of processor elements. Furthermore, although only one computing device is shown in the figure, if the method 300 or the method 400 as discussed above is implemented in a distributed or parallel manner for a particular illustrative example, i.e., the steps of the above method 300 or method 400, or the entire method 300 or method 400, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300 or method 400. In one example, instructions and data for the present module or process 505 for synchronizing a mobile channel sounding transmitter and a channel sounding receiver via a wireless side link (e.g., a software program comprising computer-executable instructions) can be loaded into memory 504 and executed by hardware processor element 502 to implement the steps, functions, or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for synchronizing a mobile channel sounding transmitter and a channel sounding receiver via a wireless side link (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
 establishing, by a processing system of a mobile channel sounding transmitter, a wireless side link between the mobile channel sounding transmitter and a channel sounding receiver;

transmitting, by the processing system to the channel sounding receiver, a wireless synchronization signal via the wireless side link; and transmitting, by the processing system, at least one channel sounding waveform in accordance with the wireless synchronization signal, wherein the wireless side link comprises an in-band wireless link, wherein the in-band wireless link comprises a communication session via a first set of time and frequency resources, wherein the first set of time and frequency resources comprises a first set of frequencies and a first set of time slots, and wherein the at least one channel sounding waveform is transmitted via a second set of time and frequency resources, wherein the second set of time and frequency resources comprises the first set of frequencies and a second set of time slots, and wherein the time slots of the second set of time slots are non-overlapping with the time slots of the first set of time slots.

2. The method of claim 1, wherein the at least one channel sounding waveform is transmitted via a transceiver of the mobile channel sounding transmitter, and wherein the wireless side link is established via the transceiver.

3. The method of claim 1, wherein the wireless synchronization signal conveys clock timing information of the mobile channel sounding transmitter.

4. The method of claim 3, wherein the wireless synchronization signal further conveys information regarding the at least one channel sounding waveform.

5. The method of claim 4, wherein the information regarding the at least one channel sounding waveform includes at least one of:
   a transmit beam identifier;
   at least one modulation parameter of the at least one channel sounding waveform; or
   timing information of the at least one channel sounding waveform.

6. The method of claim 4, wherein the wireless synchronization signal is modulated to include the information regarding the at least one channel sounding waveform.

7. A mobile channel sounding transmitter comprising:
   a processing system including at least one processor; and
   a computer-readable medium storing instructions which, when executed by the processing system, cause the processing system to perform operations, the operations comprising:
      establishing a wireless side link between the mobile channel sounding transmitter and a channel sounding receiver;
      transmitting, to the channel sounding receiver, a wireless synchronization signal via the wireless side link; and
      transmitting at least one channel sounding waveform in accordance with the wireless synchronization signal, wherein the wireless side link comprises an in-band wireless link, wherein the in-band wireless link comprises a communication session via a first set of time and frequency resources, wherein the first set of time and frequency resources comprises a first set of frequencies and a first set of time slots, and wherein the at least one channel sounding waveform is transmitted via a second set of time and frequency resources, wherein the second set of time and frequency resources comprises the first set of frequencies and a second set of time slots, and wherein the time slots of the second set of time slots are non-overlapping with the time slots of the first set of time slots.

8. A non-transitory computer-readable medium storing instructions which, when executed by a processing system of a mobile channel sounding transmitter including at least one processor, cause the processing system to perform operations, the operations comprising:
   establishing a wireless side link between the mobile channel sounding transmitter and a channel sounding receiver;
   transmitting, to the channel sounding receiver, a wireless synchronization signal via the wireless side link; and
   transmitting at least one channel sounding waveform in accordance with the wireless synchronization signal, wherein the wireless side link comprises an in-band wireless link, wherein the in-band wireless link comprises a communication session via a first set of time and frequency resources, wherein the first set of time and frequency resources comprises a first set of frequencies and a first set of time slots, and wherein the at least one channel sounding waveform is transmitted via a second set of time and frequency resources, wherein the second set of time and frequency resources comprises the first set of frequencies and a second set of time slots, and wherein the time slots of the second set of time slots are non-overlapping with the time slots of the first set of time slots.

9. The non-transitory computer-readable medium of claim 8, wherein the at least one channel sounding waveform is transmitted via a transceiver of the mobile channel sounding transmitter, and wherein the wireless side link is established via the transceiver.

10. The non-transitory computer-readable medium of claim 8, wherein the wireless synchronization signal conveys clock timing information of the mobile channel sounding transmitter.

11. The non-transitory computer-readable medium of claim 10, wherein the wireless synchronization signal further conveys information regarding the at least one channel sounding waveform.

12. The non-transitory computer-readable medium of claim 11, wherein the information regarding the at least one channel sounding waveform includes at least one of:
   a transmit beam identifier;
   at least one modulation parameter of the at least one channel sounding waveform; or
   timing information of the at least one channel sounding waveform.

13. The non-transitory computer-readable medium of claim 11, wherein the wireless synchronization signal is modulated to include the information regarding the at least one channel sounding waveform.

14. The mobile channel sounding transmitter of claim 7, wherein the at least one channel sounding waveform is transmitted via a transceiver of the mobile channel sounding transmitter, and wherein the wireless side link is established via the transceiver.

15. The mobile channel sounding transmitter of claim 7, wherein the wireless synchronization signal conveys clock timing information of the mobile channel sounding transmitter.

16. The mobile channel sounding transmitter of claim 15, wherein the wireless synchronization signal further conveys information regarding the at least one channel sounding waveform.

17. The mobile channel sounding transmitter of claim 16, wherein the information regarding the at least one channel sounding waveform includes at least one of:
   a transmit beam identifier;

at least one modulation parameter of the at least one channel sounding waveform; or timing information of the at least one channel sounding waveform.

18. The mobile channel sounding transmitter of claim 16, wherein the wireless synchronization signal is modulated to include the information regarding the at least one channel sounding waveform.

19. The method of claim 1, wherein the first set of frequencies is in a millimeter wave range.

20. The method of claim 1, wherein the first set of frequencies is in a centimeter wave range.

* * * * *